United States Patent
Waddington et al.

(10) Patent No.: US 11,928,497 B2
(45) Date of Patent: Mar. 12, 2024

(54) IMPLEMENTING ERASURE CODING WITH PERSISTENT MEMORY

(71) Applicant: International Business Machines Corporation, Armonk, NY (US)

(72) Inventors: Daniel Waddington, Morgan Hill, CA (US); Mario Blaum, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 16/773,669

(22) Filed: Jan. 27, 2020

(65) Prior Publication Data
US 2021/0232421 A1 Jul. 29, 2021

(51) Int. Cl.
G06F 9/46 (2006.01)
G06F 9/30 (2018.01)
G06F 9/50 (2006.01)
G06F 11/10 (2006.01)
G06F 16/17 (2019.01)
G06F 16/182 (2019.01)

(52) U.S. Cl.
CPC .......... *G06F 9/467* (2013.01); *G06F 9/30029* (2013.01); *G06F 9/30047* (2013.01); *G06F 9/5016* (2013.01); *G06F 11/1076* (2013.01); *G06F 16/1734* (2019.01); *G06F 16/182* (2019.01); *G06F 2209/5011* (2013.01)

(58) Field of Classification Search
CPC .. G06F 9/467; G06F 9/30029; G06F 9/30047; G06F 9/5016; G06F 11/1076; G06F 16/1734; G06F 16/182; G06F 2209/5011
USPC .......................................... 711/147
See application file for complete search history.

(56) References Cited

U.S. PATENT DOCUMENTS

| | | | |
|---|---|---|---|
| 5,787,460 A * | 7/1998 | Yashiro | G06F 11/1076 711/155 |
| 5,872,969 A | 2/1999 | Copeland et al. | |
| 6,272,607 B1 | 8/2001 | Baentsch et al. | |
| 7,168,010 B2 | 1/2007 | Yadavalli et al. | |
| 7,269,608 B2 | 9/2007 | Wong et al. | |
| 7,383,290 B2 | 6/2008 | Mehra et al. | |
| 7,681,104 B1 | 3/2010 | Sim-Tang et al. | |
| 7,856,423 B1 | 12/2010 | Revsin | |
| 8,984,239 B2 | 3/2015 | Condit et al. | |

(Continued)

OTHER PUBLICATIONS

Li et al., "BCStore: Bandwidth-Efficient In-memory KV-Store with Batch Coding," Proceedings of IEEE MSST, 2017, 13 pages, retrieved from https://scholar.google.com/citations?user=x-kydBwAAAAJ&hl=zh-CN.

(Continued)

*Primary Examiner* — Gautam Sain
*Assistant Examiner* — Wei Ma
(74) *Attorney, Agent, or Firm* — Zilka-Kotab, P.C.

(57) ABSTRACT

A computer-implemented method according to one embodiment includes receiving a request to perform a transaction in persistent memory at a first node; implementing the transaction within a volatile transaction cache at the first node; determining parity data for the transaction at the first node; sending the parity data from the first node to a parity node; and transferring results of the transaction from the volatile transaction cache to the persistent memory at the first node.

20 Claims, 11 Drawing Sheets

(56) References Cited

U.S. PATENT DOCUMENTS

| | | | |
|---|---|---|---|
| 8,990,533 | B1 | 3/2015 | Clark et al. |
| 9,122,627 | B1 | 9/2015 | Sim-Tang et al. |
| 9,547,594 | B2 | 1/2017 | Willhalm |
| 9,794,366 | B1 | 10/2017 | Pabon et al. |
| 9,923,970 | B2 | 3/2018 | Bestler et al. |
| 10,185,583 | B1 | 1/2019 | Natanzon et al. |
| 10,230,398 | B2 | 3/2019 | Schwaderer |
| 10,956,324 | B1* | 3/2021 | Giles ............... G06F 9/3855 |
| 11,175,984 | B1* | 11/2021 | Lercari ............ G06F 9/30029 |
| 2004/0030957 | A1 | 2/2004 | Yadavalli et al. |
| 2004/0111443 | A1 | 6/2004 | Wong et al. |
| 2005/0203974 | A1 | 9/2005 | Smith et al. |
| 2006/0294300 | A1* | 12/2006 | Lubbers ............ H04L 67/2819 711/113 |
| 2010/0180066 | A1* | 7/2010 | Powell ............... G06F 12/0875 711/103 |
| 2011/0145512 | A1* | 6/2011 | Adl-Tabatabai ........ G06F 9/467 711/E12.001 |
| 2011/0191522 | A1 | 8/2011 | Condict et al. |
| 2012/0023296 | A1* | 1/2012 | Yan ................... G06F 12/1072 711/147 |
| 2014/0006701 | A1 | 1/2014 | Condit et al. |
| 2014/0244952 | A1 | 8/2014 | Raj et al. |
| 2016/0034225 | A1* | 2/2016 | Yoon ................... G06F 3/0619 711/102 |
| 2016/0147620 | A1* | 5/2016 | Lesartre ............. G06F 11/1666 714/6.3 |
| 2016/0350216 | A1 | 12/2016 | Shu et al. |
| 2018/0357000 | A1* | 12/2018 | Oukid ................ G06F 3/0679 |
| 2019/0129716 | A1* | 5/2019 | Calciu .................. G06F 9/466 |
| 2021/0216531 | A1* | 7/2021 | Shveidel ............... G06F 16/11 |

OTHER PUBLICATIONS

Rashmi et al., "EC-Cache: Load-Balanced, Low-Latency Cluster Caching with Online Erasure Coding," Proceedings of the 12th USENIX Symposium on Operating Systems Design and Implementation (OSDI '16), Nov. 2-4, 2016, pp. 401-417.

Plank, J. S., "T1: Erasure Codes for Storage Applications," 4th USENIX Conference on File and Storage Technologies, Dec. 13-16, 2005, pp. 1-74.

Yiu et al., "Erasure Coding for Small Objects in In-Memory KV Storage," SYSTOR, 2017, 14 pages, retrieved from https://arxiv.org/abs/1701.08084.

Chen et al., "Efficient and Available In-Memory KV-Store with Hybrid Erasure Coding and Replication," ACM Transactions on Storage, vol. 13, No. 3, Article 25, Sep. 2017, pp. 25:1-25:30.

Chan et al., "Parity Logging with Reserved Space: Towards Efficient Updates and Recovery in erasure-coded Clustered Storage," FAST, 2014, pp. 1-37, retrieved from https://pdfs.semanticscholar.org/3751/664fd5eca030b26de491e192d15214e011fd.pdf.

Kapela, T., "pmem.io: Persistent Memory Programming," GitHub, Nov. 23, 2015, 5 pages, retrieved from https://pmem.io/2015/11/23/replication-intro.html.

Waddington, D., U.S. Appl. No. 16/551,554, filed Aug. 26, 2019.

Ren et al., "ThyNVM: Enabling Software-Transparent Crash Consistency in Persistent Memory Systems," ACM, MICRO-48, Dec. 5-9, 2015, pp. 1-14.

Nalli et al., "An Analysis of Persistent Memory Use with WHISPER," ACM, ASPLOS '17, Apr. 8-12, 2017, 14 pages.

Anonymous, "Persistent Memory Programming," pmem.io, accessed on Aug. 16, 2019, 4 pages, retrieved from https://pmem.io/pmdk/.

Coburn et al., "NV-Heaps: Making Persistent Objects Fast and Safe with Next-Generation, Non-Volatile Memories," ACM, ASPLOS '11, Mar. 5-11, 2011, 13 pages, retrieved from https://courses.engr.illinois.edu/ece598ms/sp2018/papers/paper44.pdf.

Lai et al., "Leave the Cache Hierarchy Operation as It Is: A New Persistent Memory Accelerating Approach," ACM, DAC '17, Jun. 18-22, 2017, 6 pages, retrieved from https://cseweb.ucsd.edu/~jzhao/files/persist-cache-dac2017.pdf.

Ni et al., "Reducing NVM Writes with Optimized Shadow Paging," HotStorage '18, Jul. 9-10, 2018, 6 pages, retrieved from https://www.usenix.org/node/216903.

Volos et al., "Mnemosyne: Lightweight Persistent Memory," ACM, ASPLOS '11, Mar. 5-11, 2011, 13 pages, retrieved from http://pages.cs.wisc.edu/~swift/papers/asplos11_mnemosyne.pdf.

Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

Wei et al., "NICO: Reducing Software-Transparent Crash Consistency Cost for Persistent Memory," IEEE Transactions on Computers, vol. 68, No. 9, Sep. 2019, pp. 1313-1324.

\* cited by examiner

IMPLEMENTING ERASURE CODING WITH PERSISTENT MEMORY

BACKGROUND

The present invention relates to data storage and operations, and more specifically, this invention relates to implementing erasure coding for data being operated on in persistent memory.

Protecting data against failures in hardware data storage is a necessity in modern computing systems. However, persistent memory implementations currently do not implement any efficient, cohesive means for protecting data in the event of temporary or permanent hardware failure.

SUMMARY

A computer-implemented method according to one embodiment includes receiving a request to perform a transaction in persistent memory at a first node; implementing the transaction within a volatile transaction cache at the first node; determining parity data for the transaction at the first node; sending the parity data from the first node to a parity node; and transferring results of the transaction from the volatile transaction cache to the persistent memory at the first node.

According to another embodiment, a computer program product for implementing erasure coding with persistent memory includes a computer readable storage medium having program instructions embodied therewith, where the computer readable storage medium is not a transitory signal per se, and where the program instructions are executable by a processor to cause the processor to perform a method including receiving, by the processor, a request to perform a transaction in persistent memory at a first node; implementing, by the processor, the transaction within a volatile transaction cache at the first node; determining, by the processor, parity data for the transaction at the first node; sending, by the processor, the parity data from the first node to a parity node; and transferring, by the processor, results of the transaction from the volatile transaction cache to the persistent memory at the first node.

According to another embodiment, a computer-implemented method includes a processor; and logic integrated with the processor, executable by the processor, or integrated with and executable by the processor, where the logic is configured to receive a request to perform a transaction in persistent memory at a first node; implement the transaction within a volatile transaction cache at the first node; determine parity data for the transaction at the first node; send the parity data from the first node to a parity node; and transfer results of the transaction from the volatile transaction cache to the persistent memory at the first node.

Other aspects and embodiments of the present invention will become apparent from the following detailed description, which, when taken in conjunction with the drawings, illustrate by way of example the principles of the invention.

DETAILED DESCRIPTION

Figure 1:
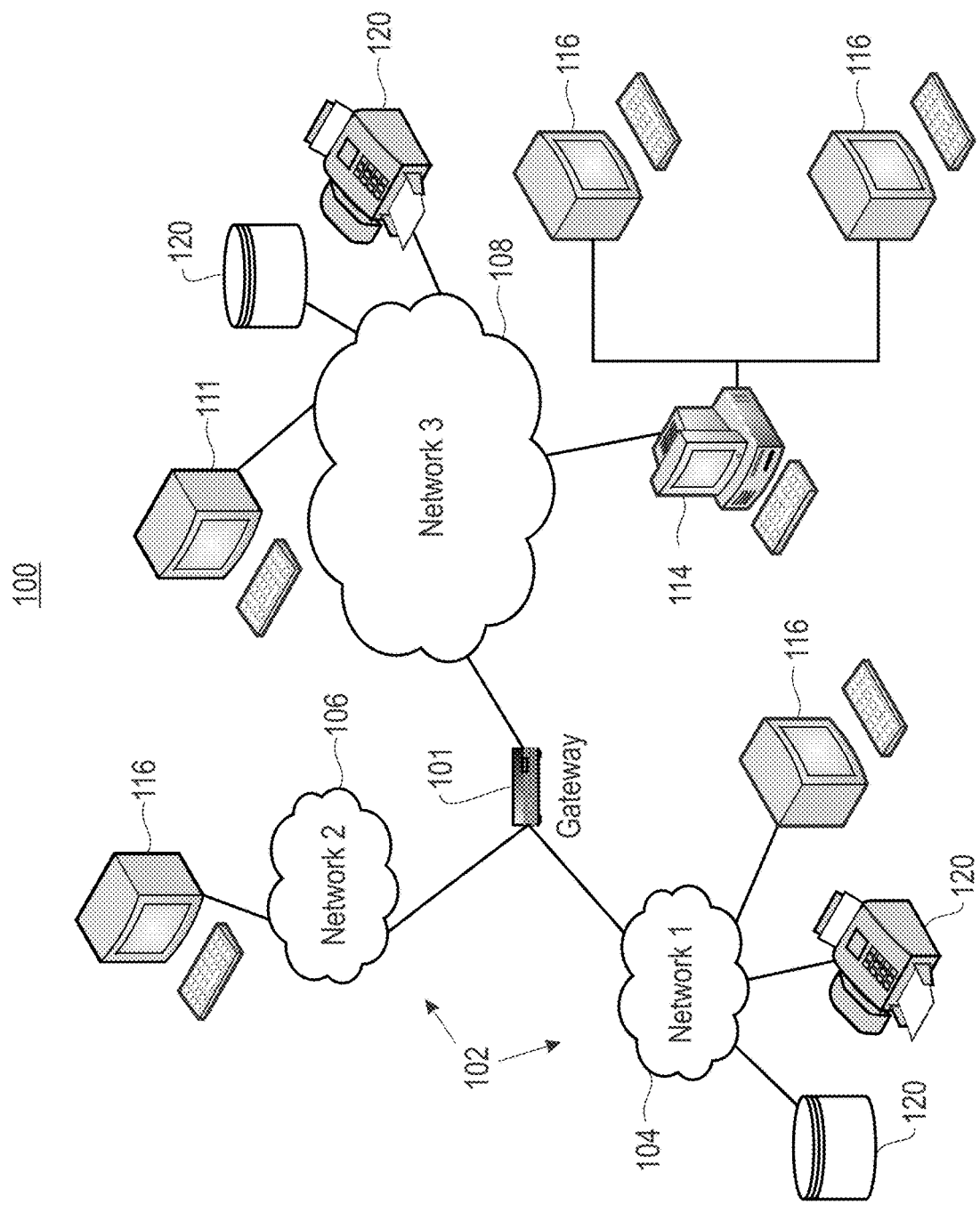
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing erasure coding with persistent memory.

In one general embodiment, a computer-implemented method includes receiving a request to perform a transaction in persistent memory at a first node; implementing the transaction within a volatile transaction cache at the first node; determining parity data for the transaction at the first node; sending the parity data from the first node to a parity node; and transferring results of the transaction from the volatile transaction cache to the persistent memory at the first node.

In another general embodiment, a computer program product for implementing erasure coding with persistent memory includes a computer readable storage medium having program instructions embodied therewith, where the computer readable storage medium is not a transitory signal per se, and where the program instructions are executable by a processor to cause the processor to perform a method including receiving, by the processor, a request to perform a transaction in persistent memory at a first node; implementing, by the processor, the transaction within a volatile transaction cache at the first node; determining, by the processor, parity data for the transaction at the first node; sending, by the processor, the parity data from the first node to a parity node; and transferring, by the processor, results of the transaction from the volatile transaction cache to the persistent memory at the first node.

In another general embodiment, a computer-implemented method includes a processor; and logic integrated with the processor, executable by the processor, or integrated with and executable by the processor, where the logic is configured to receive a request to perform a transaction in persistent memory at a first node; implement the transaction within a volatile transaction cache at the first node; determine parity data for the transaction at the first node; send the parity data from the first node to a parity node; and transfer results of the transaction from the volatile transaction cache to the persistent memory at the first node.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
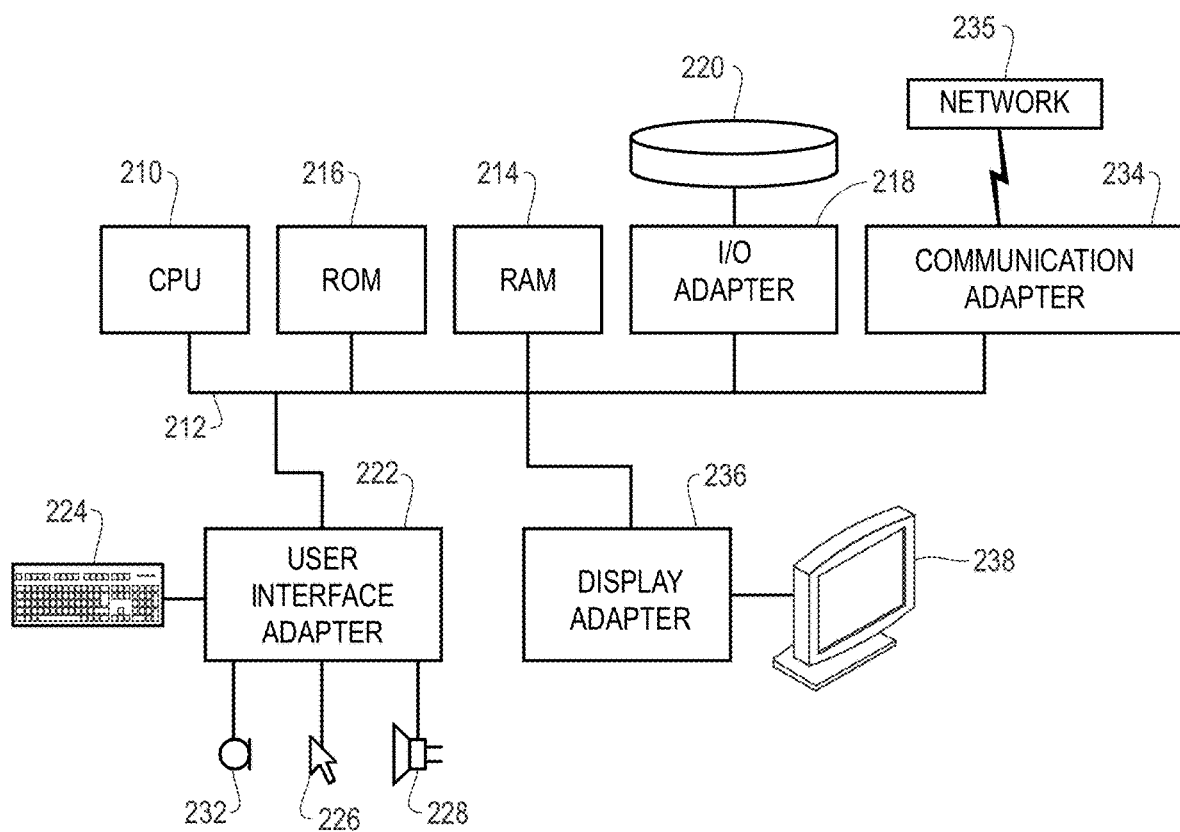
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
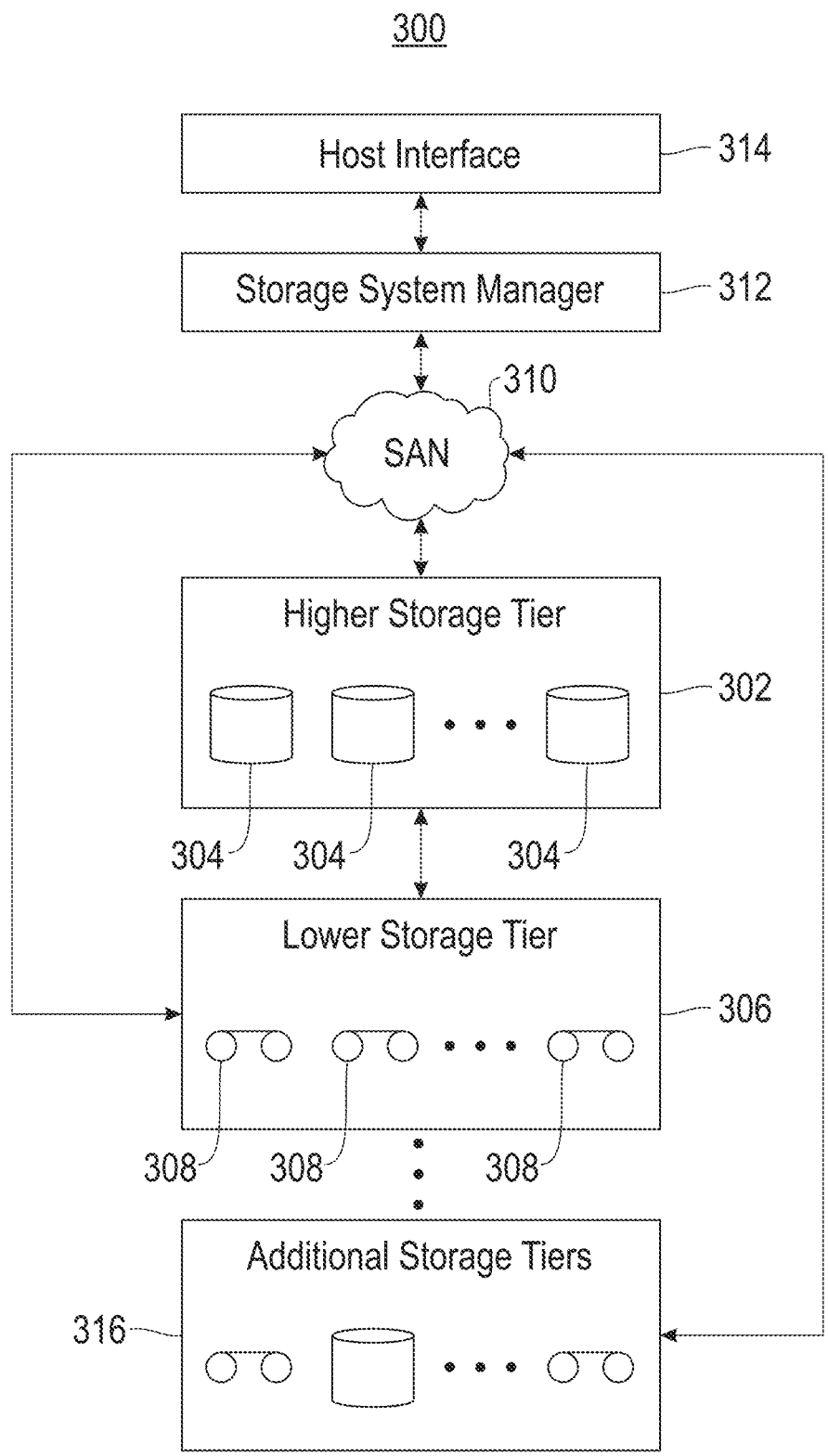
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
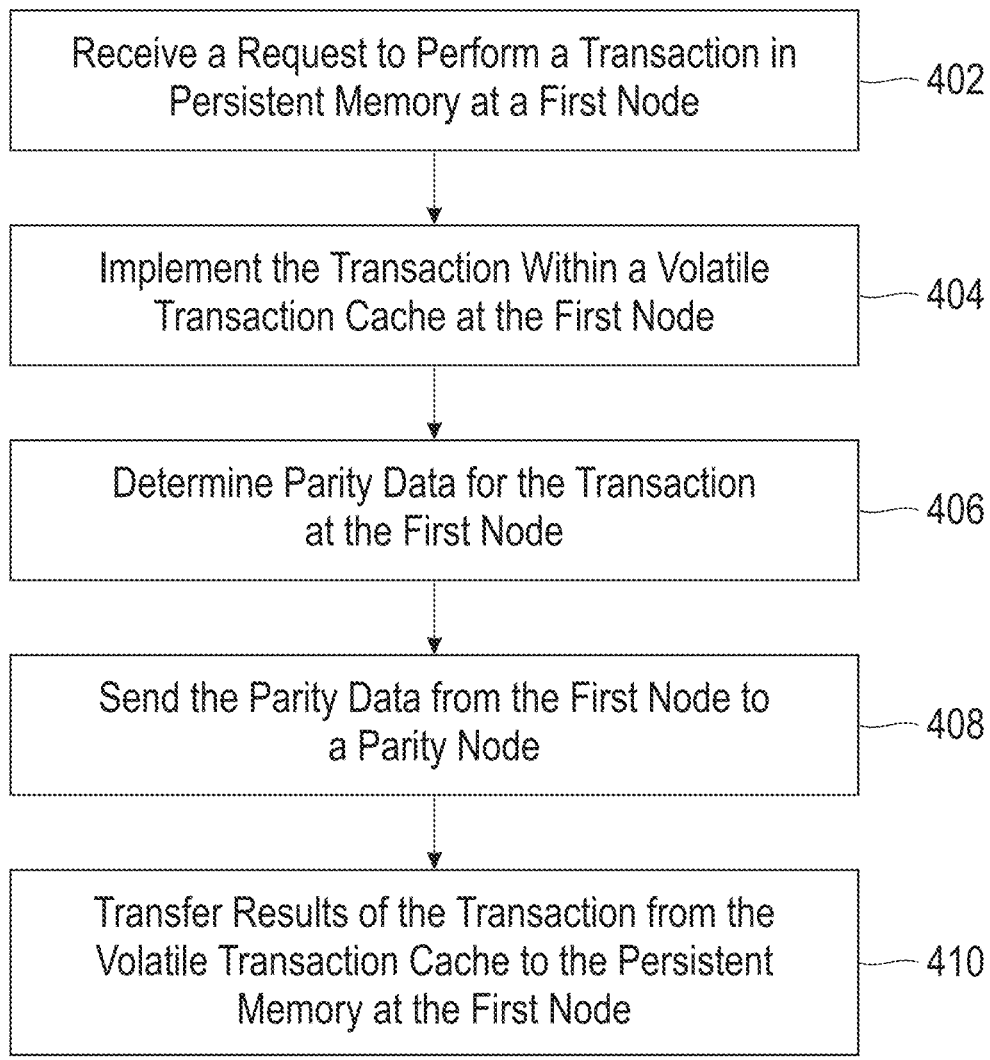
FIG. 4 illustrates a method for implementing erasure coding with persistent memory, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 9, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received to perform a transaction in persistent memory at a first node. In one embodiment, the transaction may include one or more operations to be performed on data. For example, the transaction may include the modification of data currently stored within the persistent memory. In another example, the transaction may include the removal of data currently stored within the persistent memory. In yet another example, the transaction may include the creation of data within the persistent memory.

Additionally, in one embodiment, the request may be received from an application within a computing system. In another embodiment, the persistent memory may include non-volatile memory such as 3D Xpoint (3DXP) memory, resistive random-access memory (ReRAM), Spin-Transfer Torque MRAM (STT-MRAM), ferroelectric RAM (Fe-RAM), nano-ram (NRAM), etc. In yet another embodiment, the persistent memory may include one or more hard disk drives, one or more solid-state drives, one or more tape drives, etc.

Further, in one embodiment, the first node may include one of a plurality of nodes in a network. For example, the nodes may each include one or more computing devices (e.g., servers, etc.). In another example, the nodes may perform duties such as storage, processing, erasure coding, etc. In yet another example, the network may include a network of distributed nodes.

Further still, method 400 may proceed with operation 404, where the transaction is implemented within a volatile transaction cache at the first node. In one embodiment, a correlation may first be determined between volatile memory address locations in the volatile transaction cache of the node and persistent memory locations in the persistent memory of the node. For example, the correlation may be determined in response to the request to perform the transaction.

Also, in one embodiment, the transaction cache may include a pool of volatile memory that acts as a staging cache during the transaction. In another embodiment, the transaction cache may be implemented utilizing one or more instances of volatile memory, one or more instances of non-volatile memory, etc. For example, the volatile memory may include central processing unit (CPU) data cache memory such as level-1 (L1) cache memory, level-2 (L2) cache memory, level-3 (L3) cache memory. In another example, the volatile memory may include dynamic random-access memory (DRAM), such as explicitly paged DRAM. In one embodiment, the volatile transaction cache may include a shadow copy of for data stored in persistent memory at the first node.

In addition, in one embodiment, a virtual address space may be created within the transaction cache. In another embodiment, the virtual address space may be mapped to a region of persistent memory. For example, if the transaction includes a data write to the volatile memory, a region of volatile memory may be allocated and mapped to the virtual address space within the transaction cache. In another example, if the transaction includes a modification of existing data within the persistent memory, a region of persistent memory where the existing data is located may be identified and mapped to the virtual address space within the transaction cache, whereby data is copied from the persistent memory to the volatile transaction cache.

In one embodiment, DRAM with explicitly controlled paging is used as a transaction cache. It may be assumed that assume a number of DRAM pages is significantly less than a number of persistent memory pages. A paging policy may be moved out of the kernel into the application (e.g., utilizing SEGV handling with unmap). In another aspect, DRAM may only hold a partial view of the data structure.

Additionally, in one embodiment, the persistent memory may hold a consistent (shadow) view of the complete data structure. At each transactional boundary (e.g., after a predetermined number of predefined transactions have been performed, etc.), modified regions of DRAM are explicitly flushed to the persistent memory. Prior to the flushing of the modified regions, regions are written to an undo or redo log in persistent memory. This technique allows for a checkpointing granularity to be adjusted and allows for the amortization of slower persistent memory writes.

Further, in one embodiment, DRAM pages are "unmapped" outside of transaction boundaries. For example, mapped DRAM pages may include a number of pages that are impacted by a transaction. The transaction may be limited to page-level touches, which is less than the number of available DRAM pages. If a transaction exceeds a number of available DRAM pages, the transaction must be staged, which creates more overhead.

Furthermore, in one embodiment, determining the correlation may include calculating an offset between the bases of the volatile memory address locations in the transaction cache and the persistent memory locations in the persistent memory. For example, the volatile memory address locations in the transaction cache may start at address 100, and the persistent memory locations in the persistent memory may start at address 1000. In another example, the offset may be calculated as the difference between the starting addresses (e.g., 1000−100=900).

In this way, any volatile memory address location in the transaction cache may be translated to an equivalent persistent memory location in the persistent memory, utilizing the offset.

Further still, in one embodiment, the transaction may then be performed within the volatile memory address locations of the volatile transaction cache. In another embodiment, data associated with the transaction (e.g., data to be read and/or modified by the transaction, etc.) may be transferred from the persistent memory to the volatile transaction cache (e.g., to be operated on by the transaction, etc.).

Also, in one embodiment, the associated data may be transferred into one or more volatile memory address locations of the volatile transaction cache from one or more corresponding persistent memory locations in the persistent memory. In another embodiment, the associated data may be transferred into the volatile transaction cache in response to a page fault. In yet another embodiment, operations indicated within the transaction may then be performed on the data transferred to the volatile transaction cache.

Additionally, method 400 may proceed with operation 406, where parity data for the transaction is determined at the first node. In one embodiment, the parity data may include one or more delta values indicating a difference between an instance of data located at the volatile transaction cache of the first node (after the transaction has been implemented at the volatile transaction cache) and the same instance of data located at the persistent memory of the first node (where the transaction has not yet been implemented).

Further, in one embodiment, the delta values may be determined by performing one or more operations (e.g., an exclusive OR (XOR) operation, etc.) on data at matching locations between the volatile transaction cache and the persistent memory. For example, an XOR operation may be performed between data at a volatile memory address location in the transaction cache and data at the equivalent persistent memory location in the persistent memory to determine a delta value for such data.

In this way, parity data may be determined for the transaction using the volatile transaction cache of the first node.

Further still, in one embodiment, modified volatile memory address locations in the transaction cache that have been written during the transaction may be identified, and parity data (e.g., delta values) may be determined only for data at those modified memory address locations. In another embodiment, the data associated with the transaction may be arranged within a data structure.

Also, in one embodiment, the data structure may include a tracking data structure that identifies and records volatile memory address locations of the volatile transaction cache that are modified by operations performed during the transaction. For example, these volatile memory address locations of the volatile transaction cache that are written may be identified as modified volatile memory address locations. In another embodiment, a page table may be utilized to determine pages that have been modified, and volatile memory address locations of the volatile transaction cache corresponding to these pages may be marked as modified volatile memory address locations.

In one embodiment, modified regions from a transaction/operation may be collected on a legacy data structure. For example, existing data structure operations (functions) may be instrumented with calls that register a memory region (address and length) as modified when it is executed.

In another embodiment, a modification set may be maintained in a range tree that coalesces ranges. In another aspect, thread-local storage may be used, and multiple threads may be combined at the end of the transaction. Legacy data structures can be instrumented by hand or automatically using static code analysis and transformation. Modified regions are coalesced to prevent replica flushes and to allow optimization (e.g., non-temporal writes of complete cache lines).

In addition, method 400 may proceed with operation 408, where the parity data is sent from the first node to a parity node. In one embodiment, the calculated parity values may be determined at the volatile transaction cache at the first node and may be sent from the volatile transaction cache at the first node to persistent storage at the parity node. In another embodiment, the first node may receive a confirmation from the parity node when the parity data has been received and stored at the parity node.

Furthermore, in one embodiment, the parity node may include another node separate from the first node within a network of distributed nodes. In another embodiment, the parity node may then distribute the parity data to other nodes within the distributed system (e.g., as part of an erasure encoding operation, etc.).

Further still, method 400 may proceed with operation 410, where results of the transaction are transferred from the volatile transaction cache to the persistent memory at the first node. In one embodiment, data within the modified volatile memory address locations may be copied to corresponding persistent memory locations in the persistent memory, utilizing the determined correlation. In another embodiment, the calculated offset may be applied to the modified volatile memory address locations to determine the corresponding persistent memory locations to be modified.

Also, in one embodiment, the data stored within the modified volatile memory address locations may then be copied to the corresponding persistent memory locations within the persistent memory. In another embodiment, a local undo/redo log may be avoided due to the existence of the parity data at the parity node.

Additionally, in one embodiment, pools of storage within the volatile transaction cache (e.g., all volatile memory address locations) and the persistent memory (e.g., all persistent memory locations) may be segmented into predetermined memory regions (e.g., pools, etc.) of a predetermined size (e.g., 1 GB, etc.). In another embodiment, each of the predetermined regions may be divided into a plurality of rows, where each row contains a contiguous region of blocks of memory.

As a result, both the volatile transaction cache and the persistent memory may store data organized as predetermined regions. For example, the virtual address space created within the transaction cache may be organized as a predetermined region (e.g., a working region). In another example, the persistent memory locations within the persistent memory may also be organized as a plurality of predetermined regions.

Further, in one embodiment, each row within the persistent memory may have an associated transaction ID. In another embodiment, the persistent memory may also contain a completed transaction ID and a current transaction ID. In yet another embodiment, when the copying of results is initiated from the volatile transaction cache to the persistent memory, the current transaction ID is atomically incremented at the persistent memory.

Further still, in one embodiment, as each row within the persistent memory is updated from the volatile transaction cache, its associated row transaction ID is updated with the current transaction ID. In another embodiment, when all rows associated with the transaction are updated at the persistent memory, the completed transaction ID is updated with the current transaction ID. In yet another embodiment, pools of storage within the parity node may also be segmented into predetermined memory regions in the same manner as the persistent memory.

For example, parity data may be sent as rows from the first node to the parity node. When the copying of parity data is initiated from first node to the parity node, the current transaction ID of the parity node is incremented. As each row within the parity node is updated from the first node, its associated row transaction ID is updated with the current transaction ID. When all rows associated with the parity data are updated at the parity node, the completed transaction ID is updated with the current transaction ID.

In this way, a detailed, fine-grain record of the copying may be kept, which may improve a performance of crash recovery, since only data that is known to be inconsistent needs to be recovered after a failure event (which may minimize an amount of data to be transferred across the network).

Also, in one embodiment, the logged data may be removed from the persistent memory, in response to determining that the copying has completed. For example, removing the logged data may include deleting the undo or redo log from the persistent memory. In another example, the volatile memory address locations in the transaction cache may also be unmapped in response to determining that the copying has completed.

In addition, in one embodiment, updates to the parity node and data transfers to the persistent memory in the first node may be performed in the kernel space. For example, an application may call the kernel, where the kernel performs the calculation and sending of the parity data and the updating of persistent memory. In this way, a trust boundary may be created which prevents applications from performing trusted operations and potentially jeopardizing system integrity.

Furthermore, in one embodiment, failure protection may be implemented for multiple nodes within a system. For example, two updates to different parities may be performed for a single row of data. In another example, a given row of data, parities may be atomically updated, such that multiple updates may not be allowed on the same row at the same time. In yet another example, if an EVENODD coding is implemented for parity, row and diagonal parity updates may be independently scheduled to minimize a stall time.

The above implementation may be implemented in hardware, software, or a combination of hardware and software.

In this way, distributed erasure coding may be implemented within persistent memory. This may enable the recovery of data lost at the first node when the first node crashes, even if the first node does not recover. If the first node recovers, erasure coding may be used to retrieve any incomplete data that has not been transferred from a volatile transaction cache to persistent memory of the first node. By restoring data at the first node after its recovery, a performance of the first node may be improved.

Figure 5:
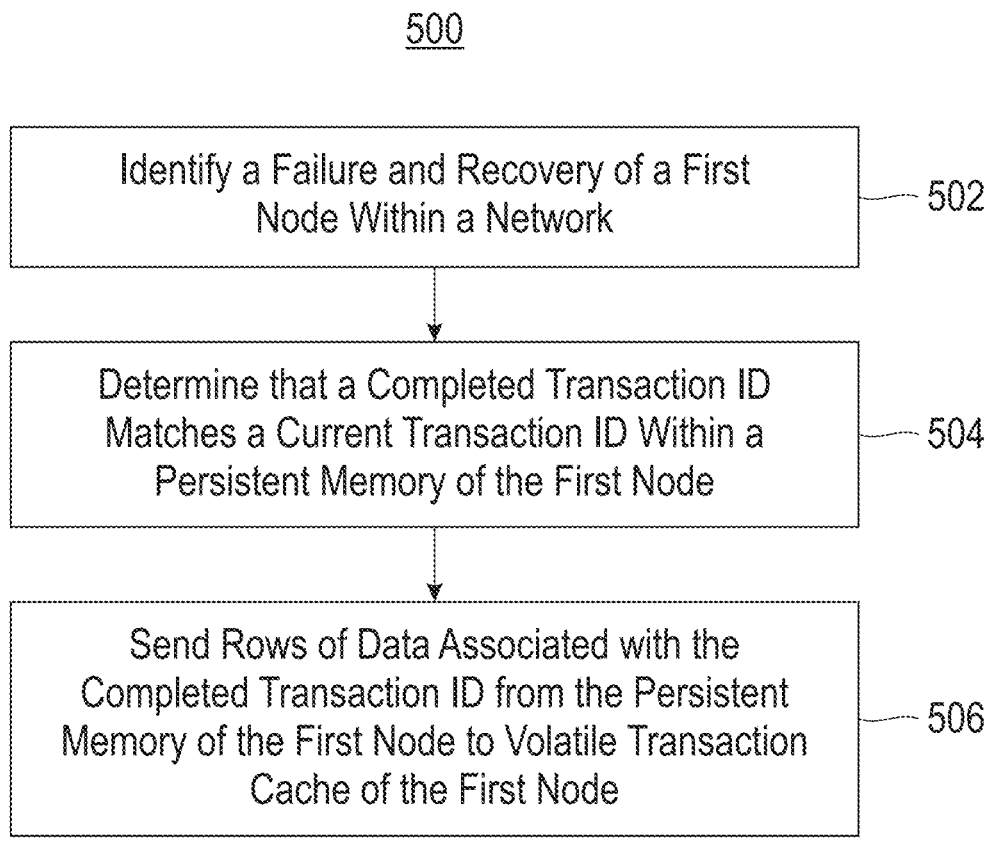
FIG. 5 illustrates a method for performing a recovery of a volatile transaction cache, in accordance with one embodiment of the present invention.

Now referring to FIG. 5, a flowchart of a method 500 for performing a recovery of a volatile transaction cache is shown according to one embodiment. The method 500 may be performed in accordance with the present invention in any of the environments depicted in FIGS. 1-3 and 9, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a failure and recovery of a first node is identified within a network. Additionally, method 500 may proceed with operation 504, where it is determined that a completed transaction ID matches a current transaction ID within a persistent memory of the first node. In one embodiment, in response to the retrieval and matching of the completed transaction ID and the current transaction ID, it may be determined that all data associated with the transaction ID was successfully sent from a volatile transaction cache of the first node to the persistent memory of the first node.

Further, method 500 may proceed with operation 506, where rows of data associated with the completed transaction ID are sent from the persistent memory of the first node to volatile transaction cache of the first node. In this way, the volatile transaction cache of the first node may be restored after the failure of the first node.

Figure 6:
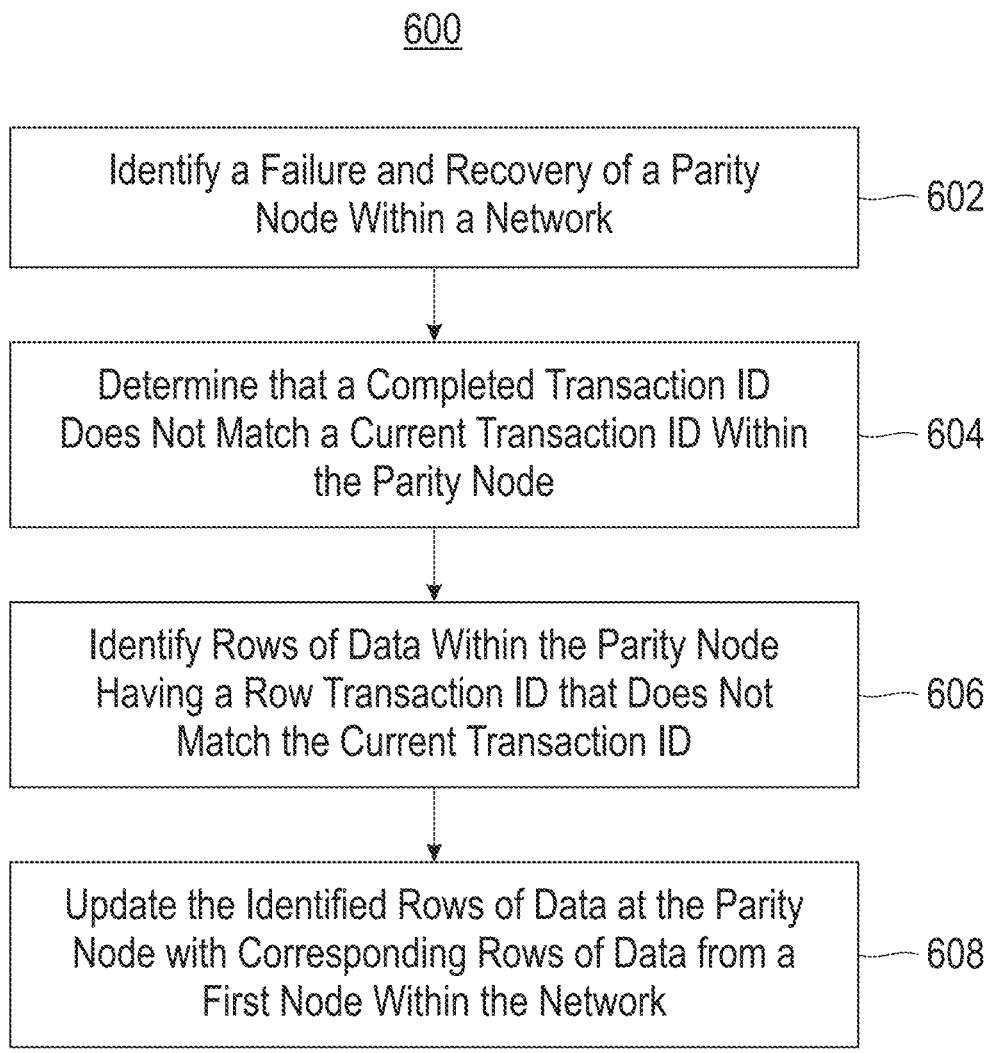
FIG. 6 illustrates a method for performing a recovery of a parity node, in accordance with one embodiment of the present invention.

Now referring to FIG. 6, a flowchart of a method 600 for performing a recovery of a parity node is shown according to one embodiment. The method 600 may be performed in accordance with the present invention in any of the environments depicted in FIGS. 1-3 and 9, among others, in various embodiments. Of course, greater or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a failure and recovery of a parity node is identified within a network. Additionally, method 600 may proceed with operation 604, where it is determined that a completed transaction ID does not match a current transaction ID within the parity node. In one embodiment, in response to retrieving the transaction IDs and determining that the completed transaction ID does not match the current transaction ID, it may be determined that all parity data associated with the current transaction ID was not completely sent from the first node to the parity node.

Further, method 600 may proceed with operation 606, where rows of data within the parity node having a row transaction ID that does not match the current transaction ID are identified. Further still, method 600 may proceed with operation 608, where the identified rows of data are updated at the parity node with corresponding rows of data from a first node within the network. In this way, the sending of parity data from the first node to the parity node may be completed.

Figure 7:
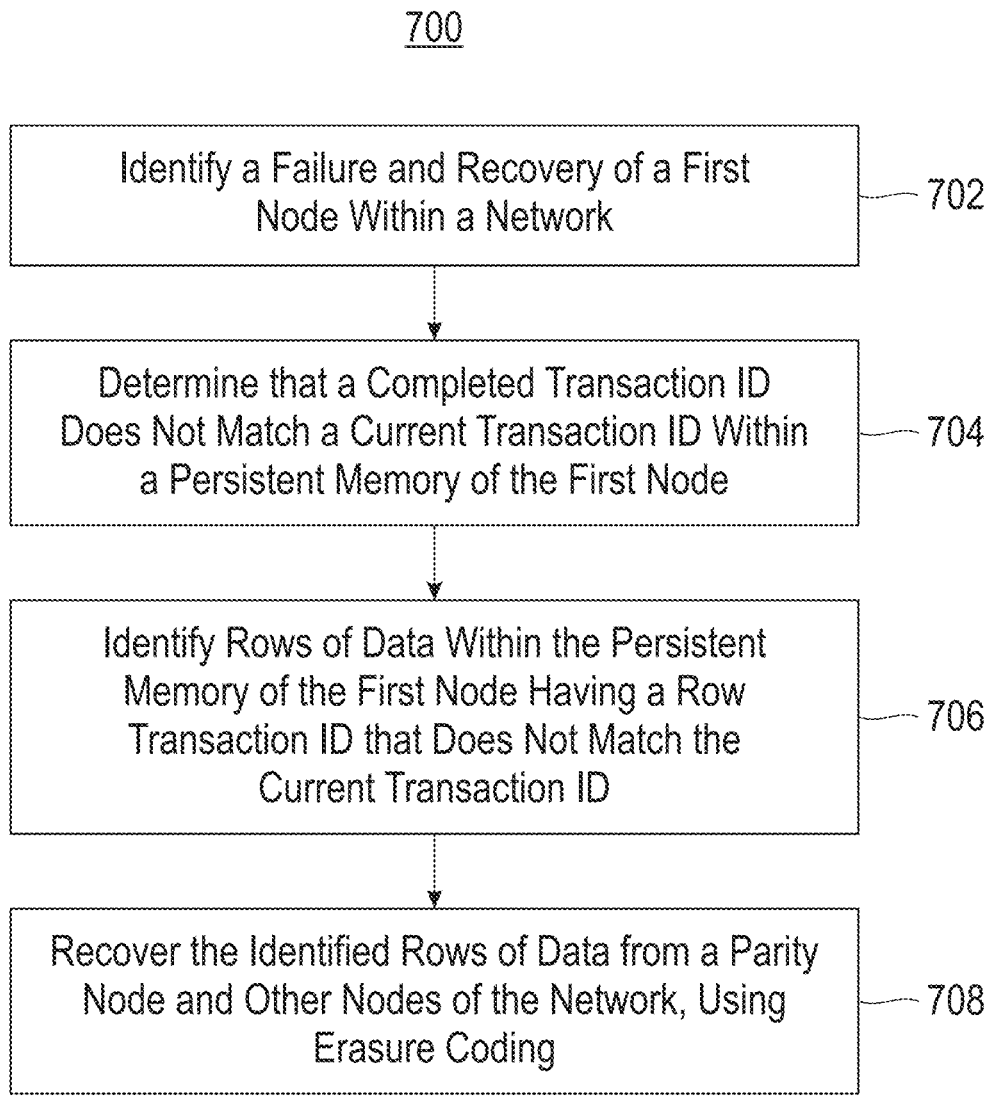
FIG. 7 illustrates a method for performing a recovery of a persistent memory, in accordance with one embodiment of the present invention.

Now referring to FIG. 7, a flowchart of a method 700 for performing a recovery of a persistent memory is shown according to one embodiment. The method 700 may be performed in accordance with the present invention in any of the environments depicted in FIGS. 1-3 and 9, among others, in various embodiments. Of course, greater or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a failure and recovery of a first node is identified within a network. Additionally, method 700 may proceed with operation 704, where it is determined that a completed transaction ID does not match a current transaction ID within a persistent memory of the first node. In one embodiment, in response to retrieving the IDs and determining that the completed transaction ID does not match the current transaction ID, it may be determined that all data associated with the transaction ID was not successfully sent from a volatile transaction cache of the first node to the persistent memory of the first node.

Further, method 700 may proceed with operation 706, where rows of data within the persistent memory of the first node having a row transaction ID that does not match the current transaction ID are identified. Further still, method 700 may proceed with operation 708, where the identified rows of data are recovered from a parity node and other nodes of the network, using erasure coding. In one embodiment, the retrieved rows of data may be stored within the persistent memory of the first node.

In this way, erasure coding may be used to retrieve missing portions of transaction data to be stored within the persistent memory of the first node after the failure of the first node.

Figure 8:
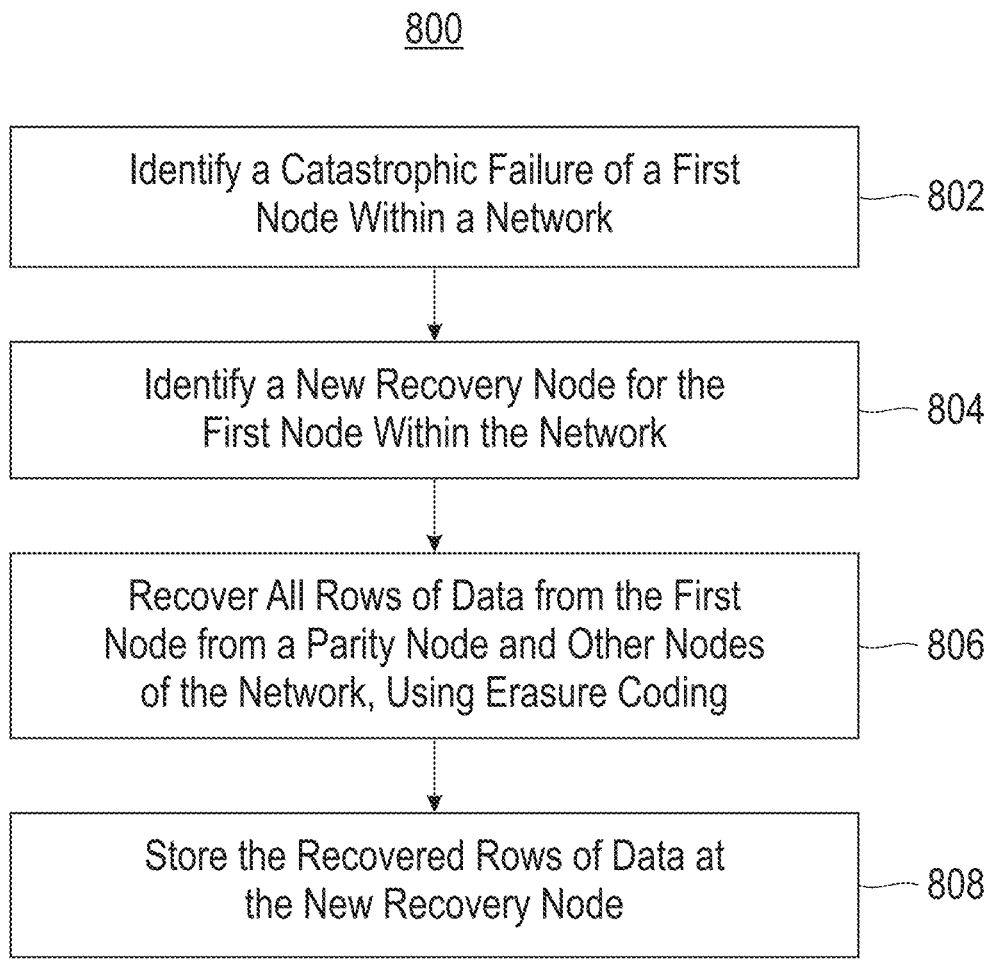
FIG. 8 illustrates a method for performing a recovery of a catastrophic failure of a node, in accordance with one embodiment of the present invention.

Now referring to FIG. 8, a flowchart of a method 800 for performing a recovery of a catastrophic failure of a node is shown according to one embodiment. The method 800 may be performed in accordance with the present invention in any of the environments depicted in FIGS. 1-3 and 9, among others, in various embodiments. Of course, greater or fewer operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a catastrophic failure of a first node is identified within a network. For example, it may be determined that first node has failed has not recovered. Additionally, method 800 may proceed with operation 804, where a new recovery node is identified for the first node within the network. For example, the new recovery node may be instantiated in response to the catastrophic failure of the first node.

Further, method 800 may proceed with operation 806, where all rows of data from the first node are recovered from a parity node and other nodes of the network, using erasure coding. Further still, method 800 may proceed with operation 808, where the recovered rows of data are stored at the new recovery node. In one embodiment, data from the most recent successful transaction may be stored in the volatile transaction cache of the new recovery node.

In this way, erasure coding may be used to completely recover a failed node within the network.

Distributed Erasure-Coding for Persistent Memory

Protection of data is fundamental to enterprise businesses. Protection against both local failures (e.g., device) and broader-impacting failures (e.g., rack, data center) is paramount to such businesses.

In exemplary block, file and object-oriented systems that use storage devices (e.g., HDD, SSD), data protection (durability) is realized at the block level. Blocks are fixed-sized units of data (e.g., 512B, 4 KB, 8 KB, etc.) that represent a unit of I/O and write atomicity in the storage device. Durability of data in storage devices is typically achieved through replication (e.g., local and network) or some form of erasure coding (e.g., RAID 5—disk striping with parity). Because active data is held in memory and in the storage device (e.g., active data has to be loaded into memory before modification), the parity representation can be updated across the network by calculating the data delta.

Persistent memory (PM) provides both the performance characteristics of memory and the capacity characteristics of storage. PM is directly load/store addressable by the CPU (e.g., it is byte addressable); there are no fixed size blocks. PM supports only aligned 64-bit write power fail atomicity.

In one embodiment, persistent memory may be made durable through distributed erasure/parity encoding.

In another embodiment, a consistent parity representation may be used to avoid the need for a consistent local representation. As a result, the local undo/redo log (and cost thereof) may be eliminated. Additionally, a shadow copy (in DRAM) may be used to allow data deltas to be derived. This may avoid reading from other nodes in the cluster during a parity update. Further, transaction IDs may be leveraged to allow reuse of locally consistent data during a rebuild. Further still, the function of trusted and untrusted code may be naturally separated.

Caches

In one embodiment, Cache lines (e.g., 64B in size) may be the unit of cache flushes. For example, caches are L1, L2 and L3. L3 is inclusive, L2 is not (i.e. L1 lines don't have to be in L2). Data may implicitly move from any cache to persistent memory (PM) at any point in time. Data may be explicitly flushed or written-through cache to the PM at any point in time according to the system's cache policy.

Definitions

Pools include a working region of a client, which is a contiguous region that is fixed in size (e.g., 1 GB, etc.). Pool expansion is based on increments of a base size. Pools hold both metadata (e.g., a heap allocator) and data (e.g., a tree). Pools hold a collection of arbitrary data structures that have effectively random write patterns. A working region holds a collection of arbitrary dynamic data structures.

Transactions define logical points in time where the consistency of the data is known to be good. They may pertain to the execution of an operation on a data structure (e.g., a tree insert, etc.). Transactions can modify any set of bytes in a pool (e.g., at a random position, etc.). Transactions mark the boundary of recovery. For example, after a power fail, recovery may be desired to the last known completed transaction. A node server holds pools and performs operations on data structures held in pools. Multiple servers (e.g., nodes, etc.) may allow for distributed erasure coding.

Architecture

A parity server holds the parity information for a cluster of nodes. In one embodiment, an XOR parity scheme may be used. Of course, any other alternative erasure coding scheme may be used. Pools are segmented into coarse working regions WR (e.g. 1 GB). WRs consist of N smaller fixed size regions (e.g. 64B) called chunks. Row transaction IDs that define the current row state are maintained in a separate contiguous region of persistent memory. They cover a contiguous array of chunks. The set of working regions (WRs) define a durable unit (DU).

In one embodiment, protections may be made against both transient and catastrophic failures. DUs are paired with DUs on other nodes and parity node(s) (e.g., A, B and P). Pool-clustering/DU-association is realized using an existing consensus protocol (e.g., PAXOS, RAFT, etc.).

Volatile shadow copies are used to hold inconsistent state during the transaction (shadow memory can be on-demand paged). Globally, at least one consistent copy (CC) is maintained at any point in time. The consistent copy is held in persistent memory either locally (directly) or remotely (as erasure coded information). Parity nodes do not require a shadow copy. Updates to parity (P) are made at a chunk (64B) granularity but are sent in batches.

In another embodiment, a "shadow" working copy of the data may be implemented. All write modifications during a transaction are made directly on this shadow representation. The combined writes (e.g., merged overlapping writes) are written to the persistent memory layer which can be considered semi-consistent. Writes are made in rows.

After all parity updates are complete, the current TID is updated, and the shadow working copy is flushed to the persistent memory layer (PSCC) Parity updates must occur before shadow flushing to determine the data delta.

Figure 9:
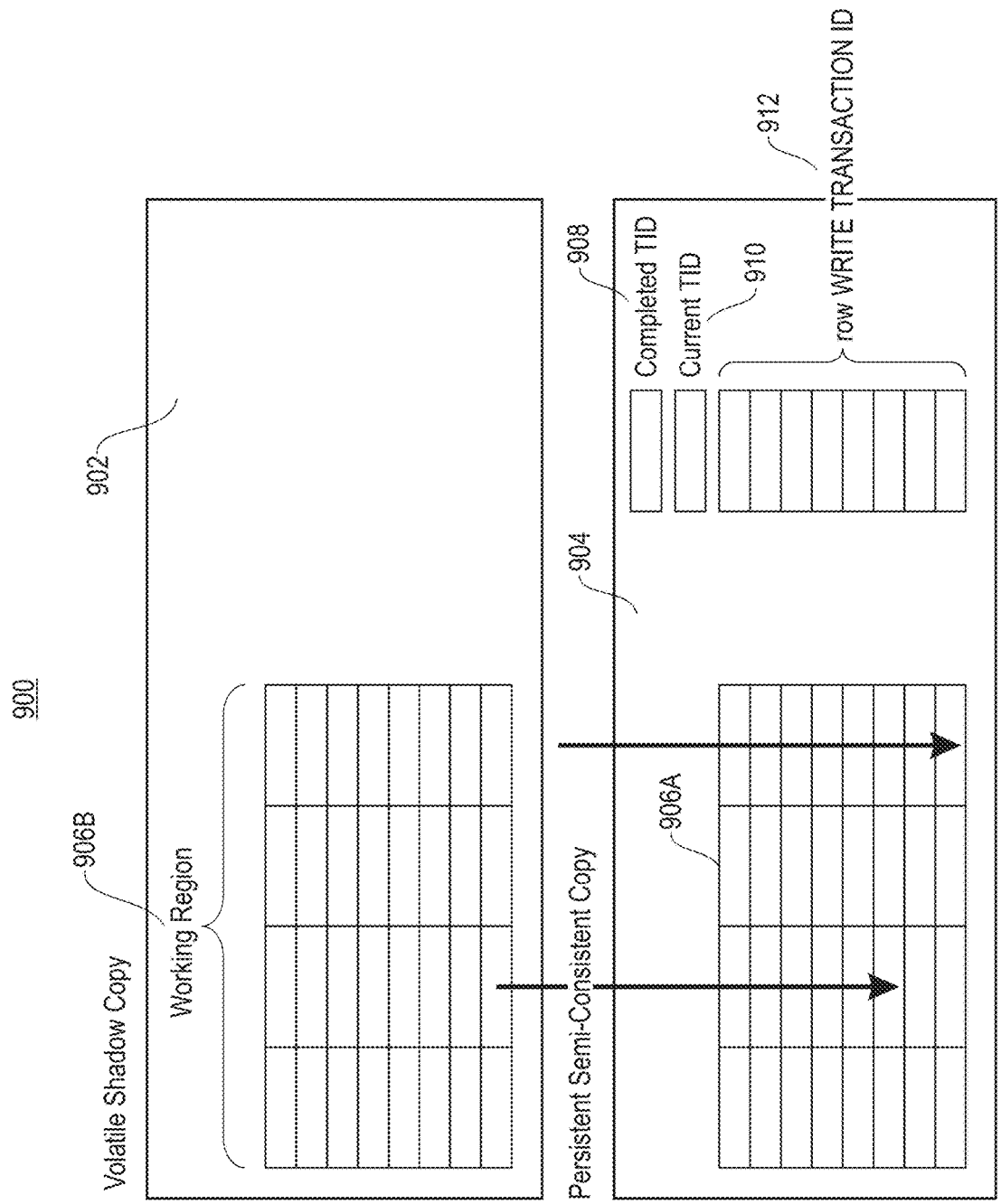
FIG. 9 illustrates exemplary data storage at a node, in accordance with one embodiment of the present invention.

FIG. 9 illustrates exemplary data storage 900 at a node, according to one exemplary embodiment. As shown, the node includes a volatile shadow copy 902 (e.g., a volatile transaction cache), as well as a persistent semi-consistent copy 904 (e.g., persistent memory). Data is segmented into a working region 906A, with a replica 906B of working region 906A stored in the shadow copy 902.

Additionally, the persistent semi-consistent copy 904 includes a completed transaction ID 908 and a current transaction ID 910. Further, each row within the working region 906A has an associated transaction ID 912. When data is copied from the replica 906B to the working region 906A, the current transaction ID 910 is incremented at the semi-consistent copy 904. As each row within the working region 906A is updated from the replica 906B, its associated row transaction ID 912 is updated with the current transaction ID 910. When all rows associated with a transaction are updated at the persistent semi-consistent copy 904, the completed transaction ID 908 is updated with the current transaction ID 910.

Exemplary Transactions

An exemplary transaction flow is found below:

Transaction begin

Program performs arbitrary number of random writes to Working Region

WR is frozen and set of modified regions (within the WR) are coalesced

During parity update, no more WR modifications are made on shadow

Parity updates: For each modified block, parity is updated with data delta between shadow and consistent copies $P'\ b = (Ab\ XOR\ Ab')\ XOR\ Pb$ E.g., send $Ab'\ XOR\ Ab$ to the parity server (XOR is linearizable)

Figure 10:
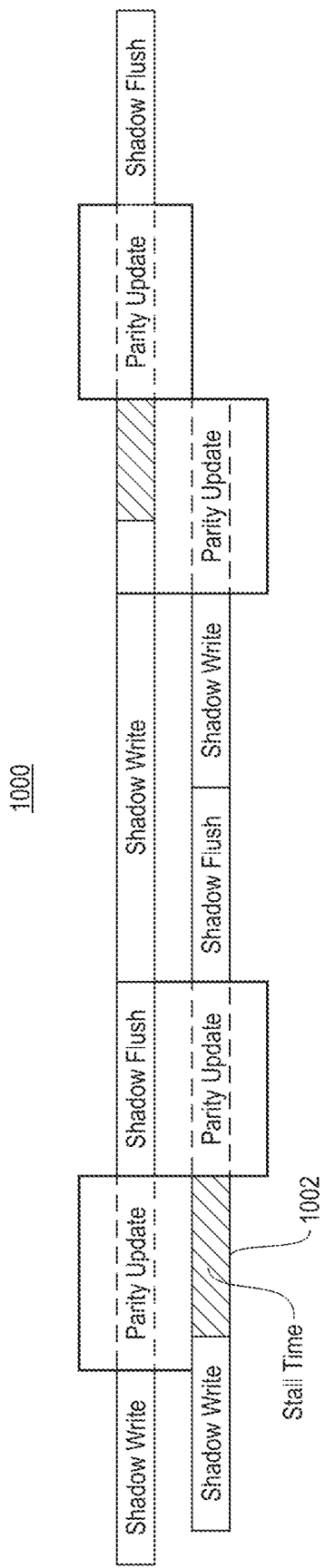
FIG. 10 illustrates an exemplary update synchronization, in accordance with one embodiment of the present invention.

All updates for a single row are "batched"
Pb row updates are atomic and locked-protected (nodes cannot update while parity is in update)
Updates for transaction are made without undo log
Updates from A and B can be concurrent (assuming different rows)
During parity updates, node A is consistent
After all parity updates are complete, update current TID, shadow is flushed to PSCC (persistent memory) layer
Parity updates before shadow flushing to determine data delta
During shadow flushing, parity is consistent
After writes for each row are flushed, WRITE state flags are updated and flushed
Both SCC blocks and WSF are explicitly flushed to persistent memory
Update completed TID (and flush) to indicate transaction completion
Transaction end
Parity Node Transaction Steps
An exemplary parity node transaction is found below:
Receive N rows of block parity deltas (Ab' XOR Ab)=PD (parity delta)
Transaction begin
Lock row
Increment current TID
For each row:
   Update row-write TID (and flush)
   For each block in row, update with parity delta (PD XOR Pb)
   Flush row-changes
   Increment row write TID (and flush)
Increment completed TID
Unlock row
Transaction end
Update Synchronization In one embodiment, shadow writes may happen concurrently, but parity updates within the same row may occur serially. FIG. 10 illustrates an exemplary update synchronization 1000, according to one embodiment, where a stall 1002 is utilized to maintain serial parity updates.

Multiple Node Failure Protection

In one embodiment, failure protection may be extended to multiple nodes. For example, EVENODD coding may be used due to its independent parity property. For example, one node may hold a row parity, and another node may hold a diagonal parity.

Figure 11:
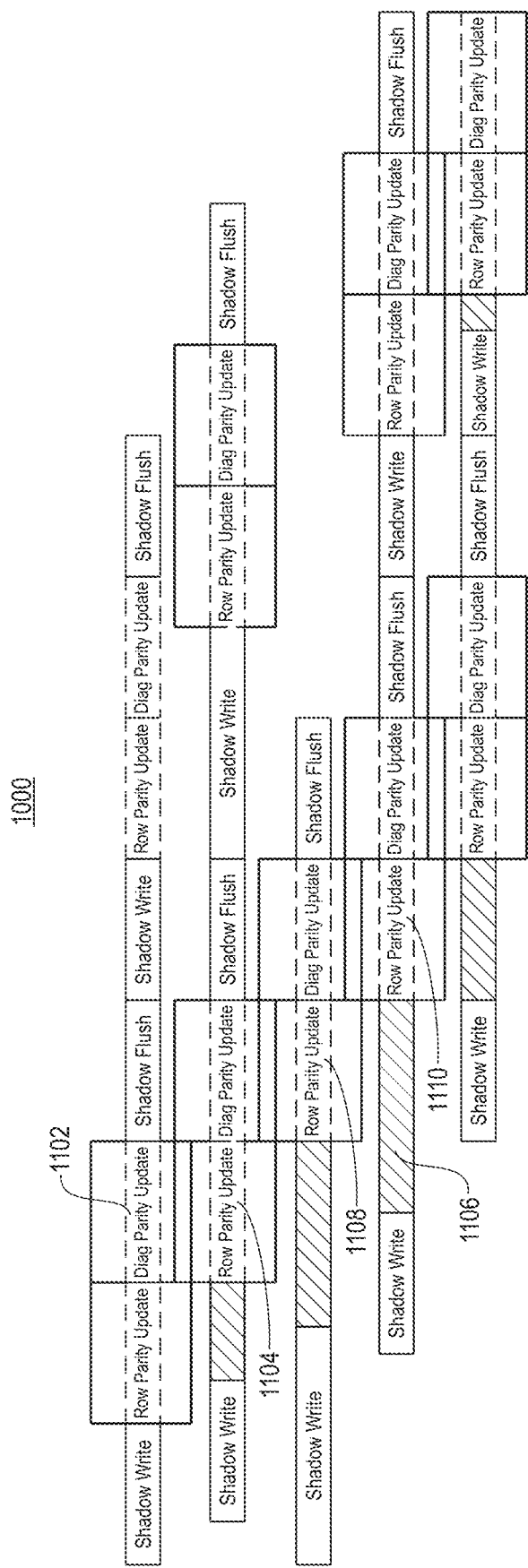
FIG. 11 illustrates an exemplary EVENODD erasure coding implementation, in accordance with one embodiment of the present invention.

FIG. 11 illustrates an exemplary EVENODD erasure coding implementation 1100, according to one embodiment. As shown, a diagonal parity update 1102 may overlap a row parity update 1104, but a stall 1106 may be used to ensure that row parity updates 1108 and 1110 do not overlap. In this way, parity updates can overlap on different rows, and updates on independent diagonals can be concurrent (except for a special diagonal).

In this way, the need for local undo/redo logs (normally used to maintain recoverable consistent state in persistent memory) may be eliminated by using distributed erasure coding protection. Additionally, a shadow copy may be used to create a data delta for parity update optimization on XOR parity. Further, transaction IDs may be used to optimize reconstruction by leveraging any remaining consistent state in the local persistent memory (both data and parity). Further still, coarse-grained working regions of memory may be dynamically associated to form durability clusters. Also, for an EVENODD application, row and diagonal parity updates may be independently scheduled to minimize a "stall time."

Additionally, a consistent parity representation may be used to avoid a need for a consistent local representation, (e.g., distributed erasure coding protection exploiting remote protection may be used for multiple purposes). As a result, a local undo/redo log (and a cost associated with implementing such log) may be eliminated. Additionally, a shadow copy may be used (e.g., in DRAM) to allow data deltas to be derived. This may avoid reading from other nodes in the cluster during a parity update, which may improve a performance of the node performing the parity update.

Further, a transaction ID may be used to optimize data reconstruction by leveraging any remaining consistent state in the local persistent memory. Further still, the function of trusted and untrusted code may be separated. Also, simple replication may be used to protect vulnerable nodes during the reconstruction period. One alternative is to use more parity nodes and more powerful erasure codes.

Further still, parity updates may be synchronized according to row and diagonal dependencies, thus improving concurrency and performance.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a request to perform a transaction in persistent memory at a first node having a central processing unit, the persistent memory having no fixed block size, the persistent memory being directly load/store addressable by the central processing unit;

implementing the transaction within a volatile transaction cache at the first node, the volatile transaction cache having a shadow copy of data stored in persistent memory at the first node, wherein write modifications made during the transaction are made directly on the shadow copy;

determining parity data for the transaction;

sending the parity data to a parity node; and transferring results of the transaction from the volatile transaction cache to the persistent memory at the first node, wherein each row within the persistent memory has an associated transaction ID, wherein shadow writes happen concurrently, and parity updates within the same row occur serially.

2. The computer-implemented method of claim 1, wherein the transaction includes a modification of data currently stored within the persistent memory, wherein the persistent memory is directly byte addressable by the central processing unit.

3. The computer-implemented method of claim 1, wherein the transaction includes a removal, by the central processing unit, of data currently stored within the persistent memory.

4. The computer-implemented method of claim 1, wherein the volatile transaction cache includes a pool of volatile memory that acts as a staging cache during the transaction.

5. The computer-implemented method of claim 1, comprising:

determining modified volatile memory address locations in the volatile transaction cache that have been written to during the transaction, identifying first data at the modified volatile memory address locations in the volatile transaction cache, and identifying second data at corresponding persistent memory address locations in the persistent memory, wherein the parity data is determined by performing one or more exclusive OR (XOR) operations on the first data and the second data.

6. The computer-implemented method of claim 5, wherein determining modified volatile memory address locations in the volatile transaction cache that have been written during the transaction includes:

determining pages that have been modified within a page table, and marking volatile memory address locations of the volatile transaction cache corresponding to these pages as the modified volatile memory address locations.

7. The computer-implemented method of claim 1, wherein the parity data is sent from the volatile transaction cache at the first node to persistent storage at the parity node.

8. The computer-implemented method of claim 1, comprising:

determining modified volatile memory address locations in the volatile transaction cache that have been written to during the transaction, identifying first data at the modified volatile memory address locations in the volatile transaction cache, and identifying second data at corresponding persistent memory address locations in the persistent memory, wherein the first data within the modified volatile memory address locations is copied to corresponding persistent memory address locations in the persistent memory, utilizing a determined correlation.

9. The computer-implemented method of claim 1, wherein the persistent memory contains a completed transaction ID and a current transaction ID, wherein:

in response to an initiation of a copying of transaction results from the volatile transaction cache to the persistent memory, the current transaction ID is incremented at the persistent memory, as each row within the persistent memory is updated from the volatile transaction cache, its associated row transaction ID is updated with the current transaction ID, and in response to an updating of all rows associated with the transaction at the persistent memory, the completed transaction ID is updated with the current transaction ID.

10. The computer-implemented method of claim 1, comprising:

determining modified volatile memory address locations in the volatile transaction cache that have been written to during the transaction, identifying first data at the modified volatile memory address locations in the volatile transaction cache, and identifying second data at corresponding persistent memory address locations in the persistent memory, wherein:

the first data within the modified volatile memory address locations is copied to corresponding persistent memory address locations in the persistent memory, utilizing a determined correlation, pools of storage within the volatile transaction cache and the persistent memory are segmented into predetermined memory regions of a predetermined size, updates to the parity node and data transfers to the persistent memory in the first node are performed in a kernel space, and the persistent memory contains a completed transaction ID and a current transaction ID, wherein:

in response to an initiation of a copying of transaction results from the volatile transaction cache to the persistent memory, the current transaction ID is incremented at the persistent memory, as each row within the persistent memory is updated from the volatile transaction cache, its associated row transaction ID is updated with the current transaction ID, and in response to an updating of all rows associated with the transaction at the persistent memory, the completed transaction ID is updated with the current transaction ID.

11. The computer-implemented method of claim 10, wherein the transaction includes a removal of data currently stored within the persistent memory, wherein determining modified volatile memory address locations in the volatile transaction cache that have been written during the transaction includes:

determining pages that have been modified within a page table, and marking volatile memory address locations of the volatile transaction cache corresponding to these pages as the modified volatile memory address locations.

12. The computer-implemented method of claim 1, wherein determining the parity data for the transaction includes:

determining modified volatile memory address locations in the volatile transaction cache that have been written during the transaction, identifying first data at the modified volatile memory address locations in the volatile transaction cache, identifying second data at corresponding persistent memory address locations in the persistent memory, and performing one or more actions on the first data and the second data to obtain the parity data.

13. The computer-implemented method of claim 1, comprising, in response to a predetermined number of transactions being performed, flushing modified regions of the volatile transaction cache to the persistent memory.

14. The computer-implemented method of claim 13, comprising, prior to the modified regions of the volatile transaction cache being flushed to persistent memory, writing the modified regions to a log in persistent memory, the log being selected from the group consisting of: an undo log and a redo log.

15. A computer program product comprising one or more computer readable storage media, and program instructions collectively stored on the one or more computer readable storage media, the program instructions comprising instructions configured to cause one or more processors to perform a method comprising:

receiving, by the one or more processors, a request to perform a transaction in persistent memory at a first node, the persistent memory having no fixed block size, the persistent memory being directly load/store addressable by a central processing unit of the first node;

implementing, by the one or more processors, the transaction within a volatile transaction cache at the first node, the volatile transaction cache having a shadow copy of data stored in persistent memory at the first node, wherein write modifications made during the transaction are made directly on the shadow copy;

determining parity data for the transaction;

sending, by the one or more processors, the parity data to a parity node;

transferring, by the one or more processors, results of the transaction from the volatile transaction cache to the persistent memory at the first node;

determining, by the one or more processors, modified volatile memory address locations in the volatile transaction cache that have been written to during the transaction, identifying, by the one or more processors, first data at the modified volatile memory address locations in the volatile transaction cache, and identifying, by the one or more processors, second data at corresponding persistent memory address locations in the persistent memory, wherein:

the first data within the modified volatile memory address locations is copied to corresponding persistent memory address locations in the persistent memory, utilizing a determined correlation, pools of storage within the volatile transaction cache and the persistent memory are segmented into predetermined memory regions of a predetermined size, updates to the parity node and data transfers to the persistent memory in the first node are performed in a kernel space, and the persistent memory contains a completed transaction ID and a current transaction ID, wherein:

in response to an initiation of a copying of transaction results from the volatile transaction cache to the persistent memory, the current transaction ID is incremented at the persistent memory, as each row within the persistent memory is updated from the volatile transaction cache, its associated row transaction ID is updated with the current transaction ID, and in response to an updating of all rows associated with the transaction at the persistent memory, the completed transaction ID is updated with the current transaction ID.

16. The computer program product of claim 15, wherein the transaction includes a modification of data currently stored within the persistent memory.

17. The computer program product of claim 15, wherein the transaction includes a removal of data currently stored within the persistent memory.

18. The computer program product of claim 15, wherein sending the parity data to the parity node includes:

copying the parity data in rows to the parity node;

in response to initiating the copying, incrementing a current transaction ID of the parity node; and in response to each row in the parity node being updated with a respective portion of the parity data, updating row transaction IDs corresponding to the respective rows in the parity node with the current transaction ID.

19. The computer program product of claim 15, wherein each row within the persistent memory has an associated transaction ID, wherein two or more shadow write operations are performed concurrently, wherein two or more parity updates corresponding to a same row are performed in series.

20. A system, comprising:

a processor; and logic integrated with the processor, executable by the processor, or integrated with and executable by the processor, the logic being configured to:

receive a request to perform a transaction in persistent memory at a first node, the persistent memory having no fixed block size;

implement the transaction within a volatile transaction cache at the first node, the volatile transaction cache having a shadow copy of data stored in persistent memory at the first node, wherein write modifications made during the transaction are made directly on the shadow copy;

determine, at the first node, parity data for the transaction, wherein determining the parity data for the transaction includes:

determining modified volatile memory address locations in the volatile transaction cache that have been written during the transaction, identifying first data at the modified volatile memory address locations in the volatile transaction cache, identifying second data at corresponding persistent memory address locations in the persistent memory, and performing one or more actions on the first data and the second data to obtain the parity data;

send the parity data from the first node to a parity node;

transfer results of the transaction from the volatile transaction cache to the persistent memory at the first node;

determine modified volatile memory address locations in the volatile transaction cache that have been written to during the transaction;

identify first data at the modified volatile memory address locations in the volatile transaction cache; and identify second data at corresponding persistent memory address locations in the persistent memory, wherein:

the first data within the modified volatile memory address locations is copied to corresponding persistent memory address locations in the persistent memory, utilizing a determined correlation, pools of storage within the volatile transaction cache and the persistent memory are segmented into predetermined memory regions of a predetermined size, updates to the parity node and data transfers to the persistent memory in the first node are performed in a kernel space, and the persistent memory contains a completed transaction ID and a current transaction ID, wherein:

in response to an initiation of a copying of transaction results from the volatile transaction cache to the persistent memory, the current transaction ID is incremented at the persistent memory, as each row within the persistent memory is updated from the volatile transaction cache, its associated row transaction ID is updated with the current transaction ID, and in response to an updating of all rows associated with the transaction at the persistent memory, the completed transaction ID is updated with the current transaction ID.

* * * * *